US008823972B2

(12) United States Patent
Miyata

(10) Patent No.: US 8,823,972 B2
(45) Date of Patent: Sep. 2, 2014

(54) PRINT CONTROL DEVICE, PRINTING SYSTEM AND COMPUTER-READABLE RECORDING MEDIUM STORING PRINTING PROGRAM

(75) Inventor: Yuji Miyata, Aichi (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1106 days.

(21) Appl. No.: 12/130,233

(22) Filed: May 30, 2008

(65) Prior Publication Data

US 2008/0297823 A1 Dec. 4, 2008

(30) Foreign Application Priority Data

May 31, 2007 (JP) ................................. 2007-145526

(51) Int. Cl.
*G06F 3/12* (2006.01)

(52) U.S. Cl.
CPC .............. *G06F 3/125* (2013.01); *G06F 3/1204* (2013.01); *G06F 3/1208* (2013.01); *G06F 3/1248* (2013.01); *G06F 3/1285* (2013.01)
USPC ........................... 358/1.15; 715/243; 718/100

(58) Field of Classification Search
USPC ........ 358/1.15, 1.1, 1.13, 1.16, 1.18, 1.2, 1.6, 358/1.9, 453; 270/1.01; 345/506; 382/100; 709/201, 223, 226; 715/243, 700; 718/100; 726/1
See application file for complete search history.

(56) References Cited

U.S. PATENT DOCUMENTS

| 5,129,639 | A | * | 7/1992 | DeHority | 399/370 |
| 6,115,104 | A | * | 9/2000 | Nakatsuka | 355/40 |
| 6,119,137 | A | * | 9/2000 | Smith et al. | 715/234 |
| 6,173,295 | B1 | * | 1/2001 | Goertz et al. | 715/209 |
| 6,788,428 | B1 | * | 9/2004 | Shimokawa | 358/1.15 |
| 7,283,275 | B2 | | 10/2007 | Kitahara et al. | |
| 2002/0027673 | A1 | * | 3/2002 | Roosen et al. | 358/1.13 |
| 2002/0051180 | A1 | * | 5/2002 | Shimbori et al. | 358/1.15 |
| 2002/0112008 | A1 | * | 8/2002 | Christenson et al. | 709/206 |
| 2002/0120742 | A1 | * | 8/2002 | Cherry | 709/226 |
| 2002/0191201 | A1 | * | 12/2002 | Kimbell et al. | 358/1.2 |
| 2003/0081240 | A1 | * | 5/2003 | Soto et al. | 358/1.15 |
| 2004/0001217 | A1 | * | 1/2004 | Wu | 358/1.15 |
| 2004/0046984 | A1 | * | 3/2004 | Azami et al. | 358/1.13 |
| 2005/0044200 | A1 | | 2/2005 | Aritomi | |

(Continued)

FOREIGN PATENT DOCUMENTS

JP 2001-154961 A 6/2001
JP 2002-287940 A 10/2002

(Continued)

OTHER PUBLICATIONS

JP Office Action dtd Jun. 2, 2009, JP Appln. 2007-145526.

(Continued)

*Primary Examiner* — David S Cammack
(74) *Attorney, Agent, or Firm* — Banner & Witcoff, Ltd.

(57) ABSTRACT

A print controlling device is provided with an image data processing module configured to apply an image processing operation to an image data, a transmitting module configured to transmit the processed image data which is processed by the image data processing module to a printing device, and a modifying module configured to modify the image processing operation in accordance with the printing device to which the modified image data is to be transmitted.

13 Claims, 13 Drawing Sheets

(56) References Cited

U.S. PATENT DOCUMENTS

| | | |
|---|---|---|
| 2005/0046886 A1* | 3/2005 | Ferlitsch .................. 358/1.13 |
| 2005/0046900 A1* | 3/2005 | Nakamori ................. 358/1.18 |
| 2005/0237552 A1* | 10/2005 | Nagasaka .................. 358/1.9 |
| 2006/0028667 A1 | 2/2006 | Saito |
| 2006/0082802 A1* | 4/2006 | Furuya ..................... 358/1.13 |
| 2006/0187479 A1 | 8/2006 | Kikuchi |
| 2007/0041610 A1* | 2/2007 | Kaneko et al. ............. 382/100 |
| 2008/0297840 A1 | 12/2008 | Miyata |

FOREIGN PATENT DOCUMENTS

| | | |
|---|---|---|
| JP | 2002-314800 A | 10/2002 |
| JP | 2005-031792 | 2/2005 |
| JP | 2005-148927 A | 6/2005 |
| JP | 2006-048537 | 2/2006 |
| JP | 2006-228066 | 8/2006 |
| JP | 2006-237705 A | 9/2006 |
| JP | 2006251853 A * | 9/2006 |
| JP | 2008-299507 A | 12/2008 |

OTHER PUBLICATIONS

JP Office Action dtd Dec. 15, 2009, JP Appln. 2007-145526, English translation.

* cited by examiner

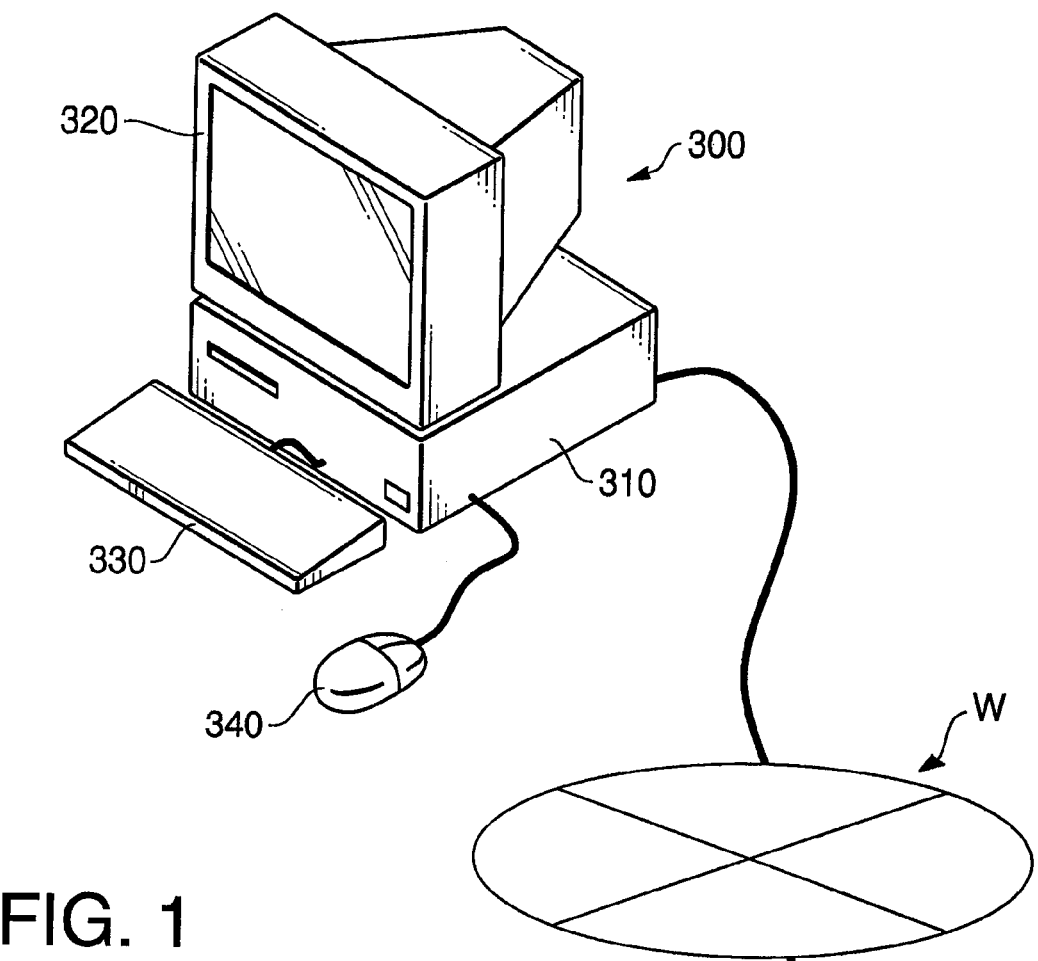
FIG. 1
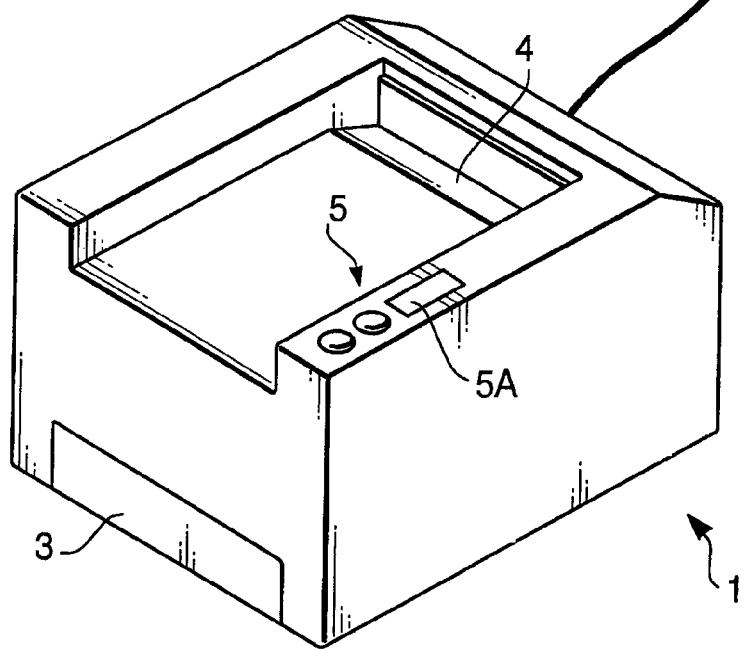

| function | setting item | remarks |
|---|---|---|
| sheet size | A4,A5,B5,B6,A3,B4 | divide into 2 pages for A3 or B4 sheet |
| tray | first tray<br>second tray | first and second trays can accommodate A4, A5, B5, B6 sheets<br>manual feed tray can accommodates all |
| orientation | portrait, landscape | rotate 90 degrees for landscape orientation |

FIG.7A

| function | setting item | remarks |
|---|---|---|
| sheet size | A4,A5,B4,B5,B6,A3 | A3 is usable only in manual feed tray, and reduce image if another tray is used |
| tray | first tray<br>second tray<br>manual feed tray | first and second trays can accommodate A4, A5, B4, B5, B6 sheets<br>manual feed tray can accommodates all |
| orientation | portrait, landscape | rotate 270 degrees for landscape orientation |

FIG.7B

```
<print setting>
<sheet size>B4</sheet size>
<tray>first tray</tray>
<orientation>portrait</orientation>
</print setting>
```

FIG.8A

```
<print setting>
<sheet size>B4</sheet size>
<tray>first tray</tray>
<orientation>portrait</orientation>
<number of division>2</number of division>
</print setting>
```

FIG.8B

```
<print setting>
<sheet size>A4</sheet size>
<tray>second tray</tray>
<orientation>landscape</orientation>
</print setting>
```

FIG.9A

```
<print setting>
<sheet size>A3</sheet size>
<tray>second tray</tray>
<orientation>landscape</orientation>
<scaling>reduction</scaling>
<rotation>270 degrees</rotation>
</print setting>
```

FIG.9B

PRINT CONTROL DEVICE, PRINTING SYSTEM AND COMPUTER-READABLE RECORDING MEDIUM STORING PRINTING PROGRAM

CROSS-REFERENCE TO RELATED APPLICATION

This application claims priority under 35 U.S.C. §119 from Japanese Patent Application No. 2007-145526 filed on May 31, 2007. The entire subject matter of the application is incorporated herein by reference.

BACKGROUND

1. Technical Field

The following description relates to a print control device, a printing system employing the print control device and a computer-readable recording medium storing printing program for modifying image data to be transmitted from the print control device to a printer.

2. Related Art

Conventionally, there is known a print control device such as a personal computer which is provided with an image data modifying module configured to apply a modifying process to image data to be input in a printer. Hereinafter, such an image data modifying module will be referred to as a filter. As examples of modification provided by filters, a page division for dividing a page of image into a plurality of pieces of image to be printed on a plurality of pages of recording sheet, respectively, a scaling for changing the size of an image to be printed on a recording sheet and the like have been known.

SUMMARY OF THE INVENTION

Depending on the printers, processes to be provided by the filters should be varied. Therefore, in the print control device (e.g., a personal computer), for each printer, a printer driver and necessary filters may be installed. An example of such a configuration is disclosed in Japanese Patent Provisional Publication No. 2005-31792 (hereinafter, referred to as '792 publication).

In order to install the printer drivers and filters for each and every printer, a considerably large capacity is required on a hard disk driver or the like. It may be possible to select filters for each printer in order to avoid installation of all the filters available for each printer. However, in such a case, appropriate filters should be selected depending on property of each printer, which is practically very difficult.

To avoid the above problem, for each printer, only necessary filters may be installed depending on the characteristic of each printer.

However, in order to meet various demands of users, it is very difficult to determine the necessary filters for each printer.

Considering the above deficiencies, the present invention is advantageous in that an improved print control device and programs therefor can be provided. That is, according to aspects of the invention, even if programs for processing image data are not installed for each printer, appropriate processing can be provided for each printing device.

According to aspects of the present invention, there is provided a print controlling device, provided with an image data processing module configured to apply an image processing operation to an image data, a transmitting module configured to transmit the processed image data which is processed by the image data processing module to a printing device, and a modifying module configured to modify the image processing operation in accordance with the printing device to which the modified image data is to be transmitted.

According to further aspects of the invention, there is provided a computer accessible recording medium containing a program to be executed by a computer, the program causing the computer to function as a print controlling device. The program causes the computer to execute the steps of modifying an image processing operation in accordance with a characteristic of a printing device to which the modified image data is to be transmitted, applying the modified image processing operation to the image data, and transmitting the modified image data to the printing device.

According to the above configurations, appropriate processing can be provided corresponding to each printing device without installing the programs for processing image data for each and every printer.

BRIEF DESCRIPTION OF THE ACCOMPANYING DRAWINGS

FIG. 1 is a perspective view schematically showing an appearance of a printing system to which the present invention is applied.

Figure 5A:
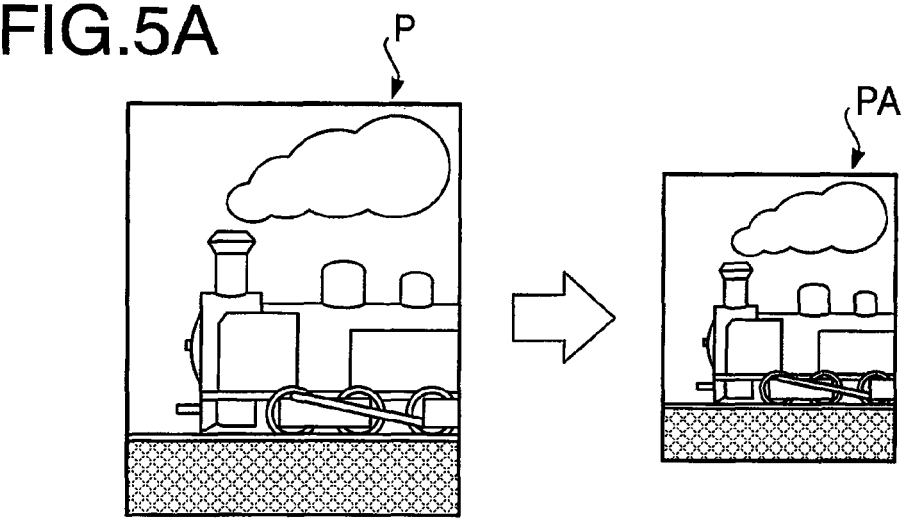
Figure 5B:
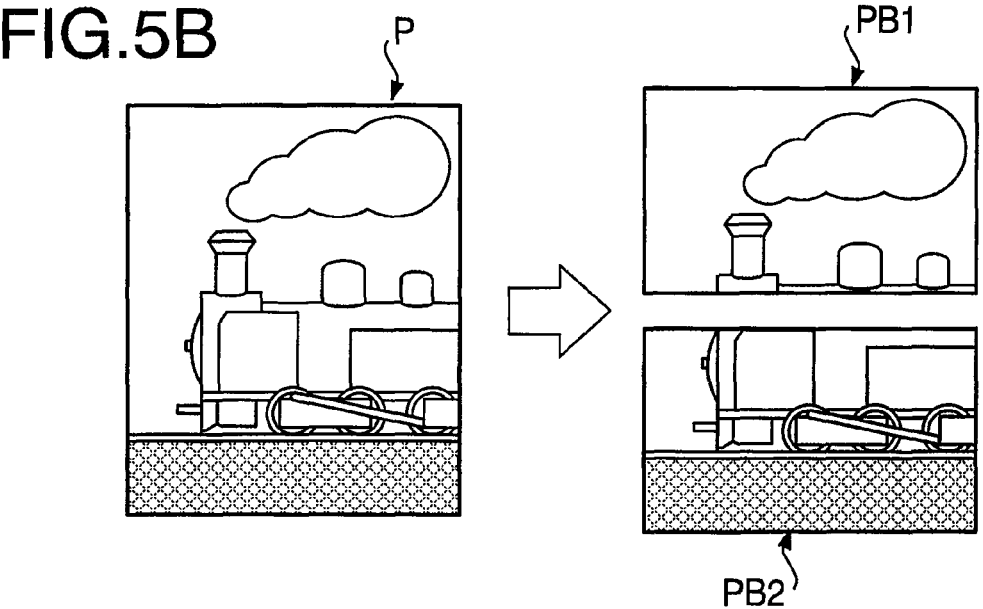
Figure 5C:
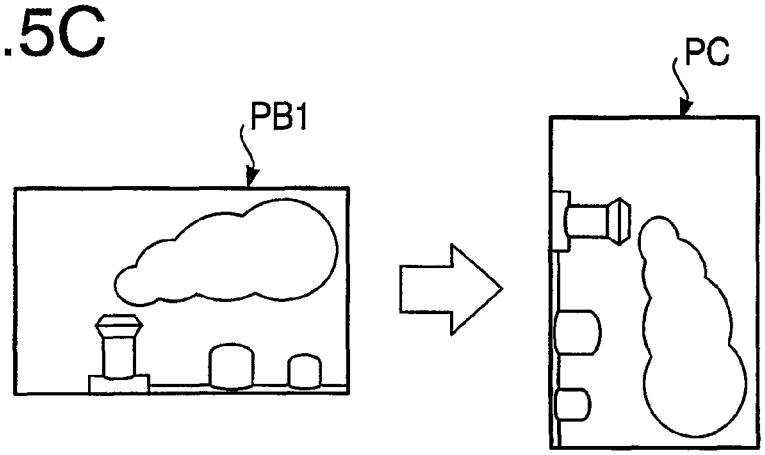

FIGS. 5A, 5B and 5C schematically show examples of filtering processes.

Figure 4:
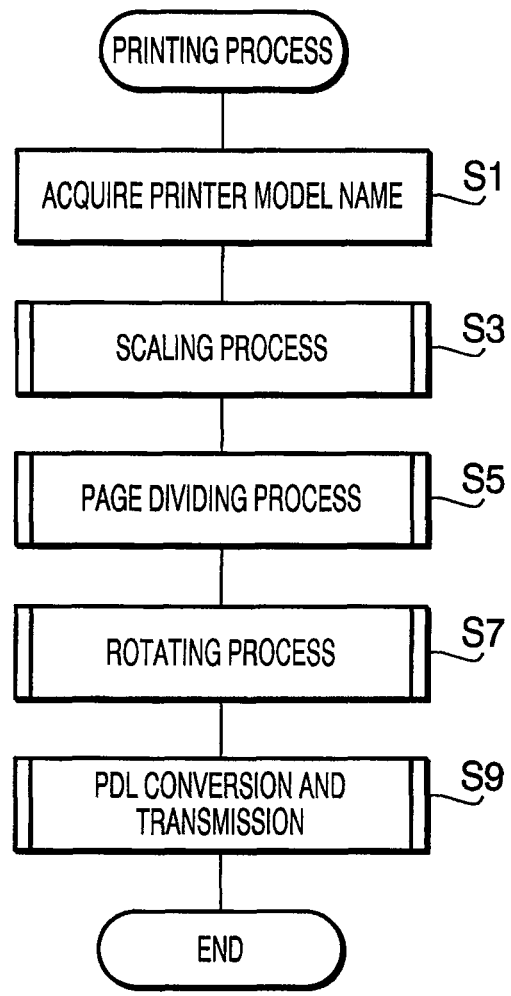
FIG. 4 is a flowchart illustrating a printing process executed when the personal computer executes a printing operation.
Figure 6:
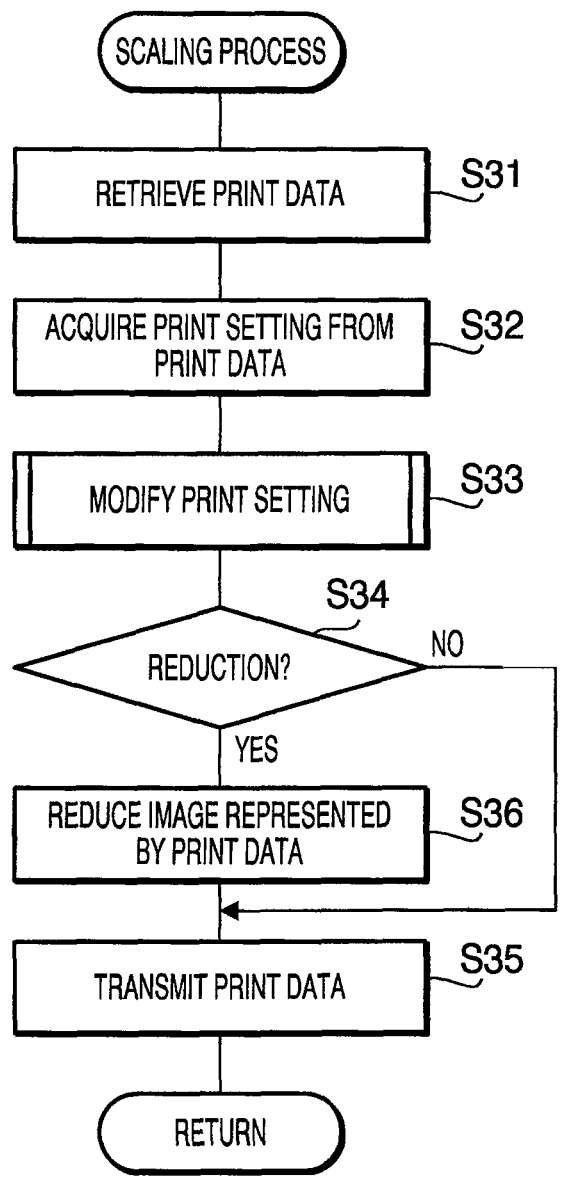

FIG. 6 is a flowchart illustrating a scaling process which is called in the printing process shown in FIG. 4.

FIGS. 7A and 7B are tables showing examples of functions depending on printer models.

FIGS. 8A and 8B show examples of the print setting corresponding to one of the printer models.

FIGS. 9A and 9B show examples of modification of the print setting corresponding to another printer model.

Figure 10:
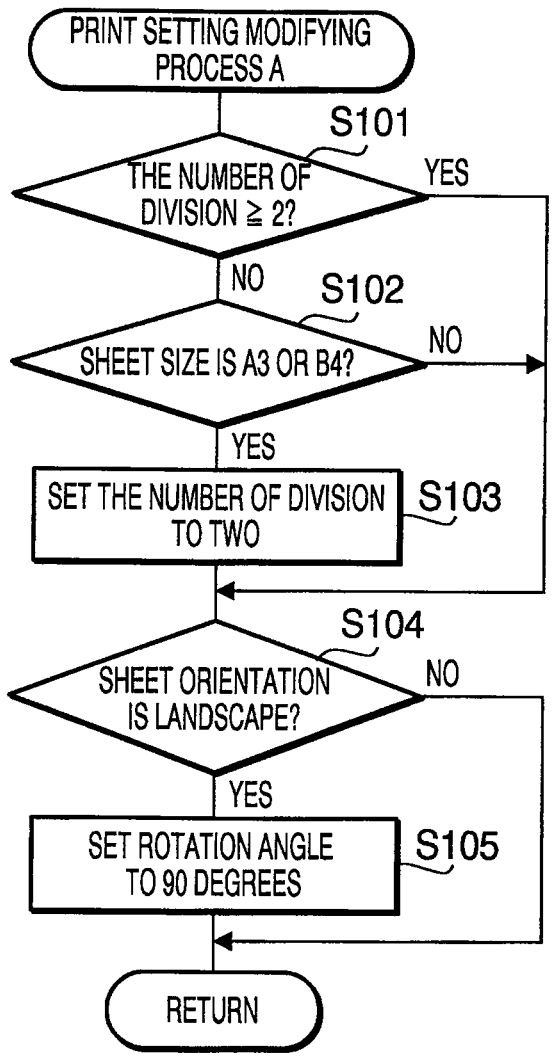

FIG. 10 is a flowchart illustrating a print setting modifying process A, which corresponds to the "one" printer model.

Figure 11:
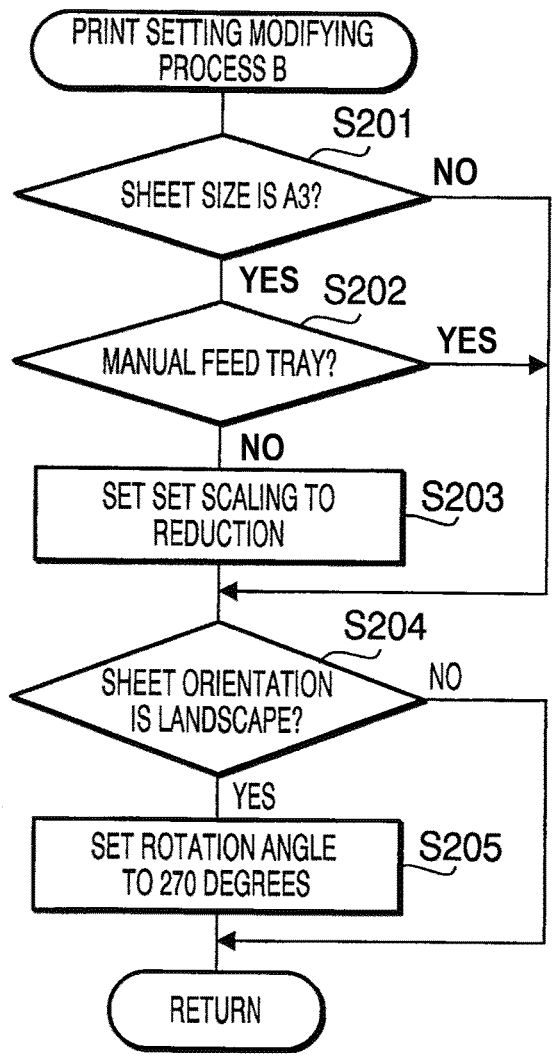

FIG. 11 is a flowchart illustrating a print setting modifying process B, which corresponds to the "another" printer model.

Figure 12:
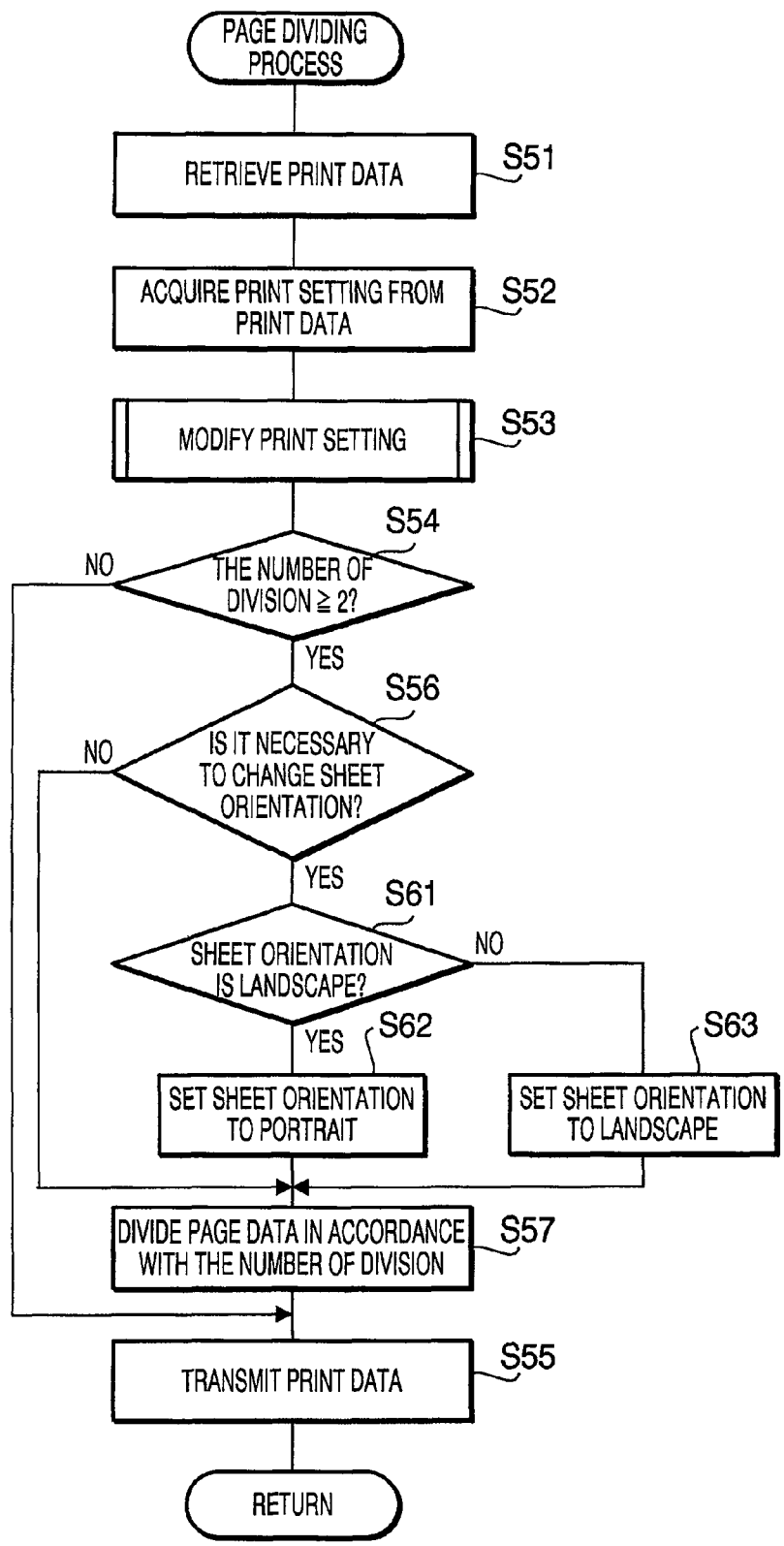

FIG. 12 is a flowchart illustrating a page dividing process called in the printing process shown in FIG. 4.

Figure 13:
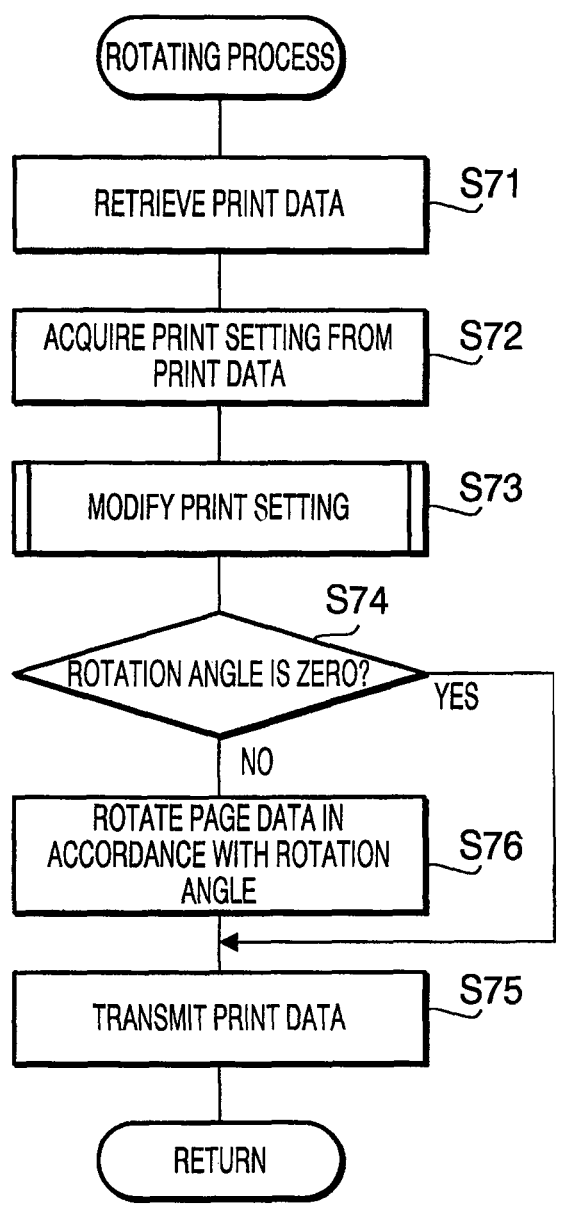

FIG. 13 is a flowchart illustrating a rotating process called in the printing process shown in FIG. 4.

Figure 14:
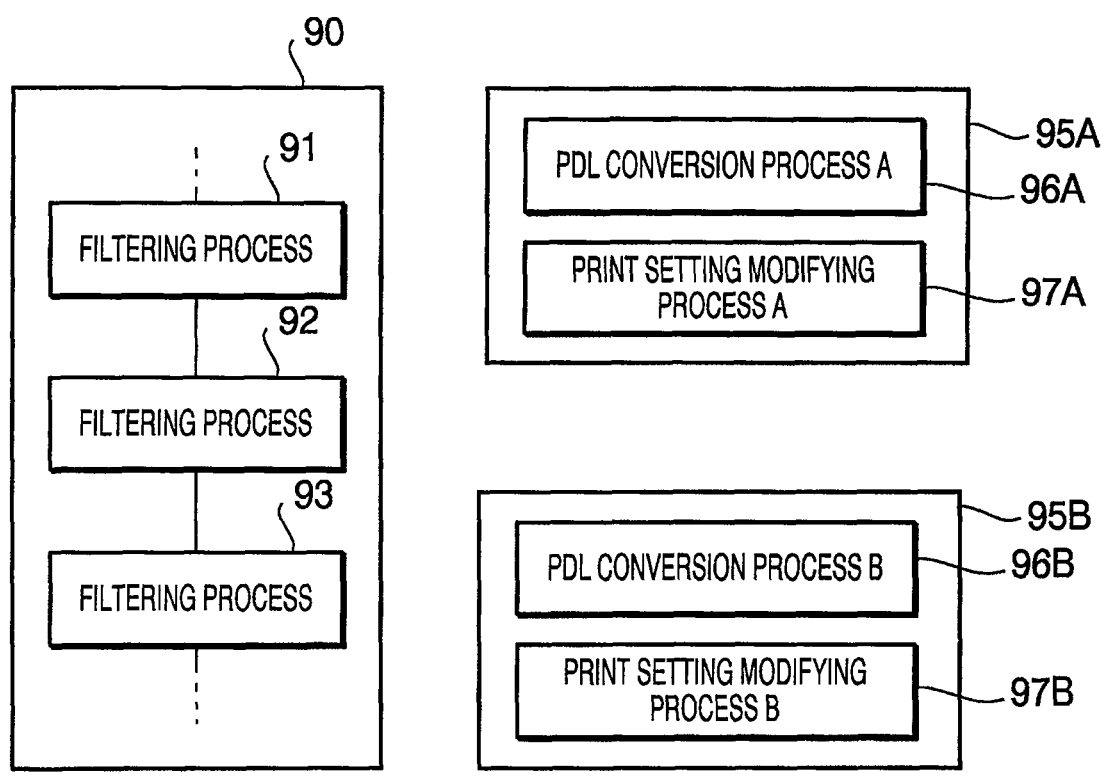

FIG. 14 schematically illustrates effects provided by the configuration of the embodiment.

DETAILED DESCRIPTION OF THE EMBODIMENTS

Referring now to the drawings, a description will be given in detail of preferred embodiment in accordance with the present invention.

FIG. 1 is a perspective view of a printing system according to an embodiment of the invention. The printing system includes, as show in FIG. 1, a color laser printer (hereinafter, simply referred to as a printer) 1, and a personal computer (hereinafter, referred to as a PC) 300, which is connected with the printer 1 via a network W such as a LAN (Local Area Network) or the Internet. It should be noted that, a plurality of printers may be additionally connected to the network W.

The printer 1 is provided with a well-known printer engine 2 (see FIG. 2) which is configured to form images in accordance with a so-called electro-photographic imaging process, using yellow, magenta, cyan and black toners. The printer engine 2 forms images on recording sheets on page basis. Specifically, the recording sheets are accommodated in a sheet feed tray 3 and fed inside the printer 1 one by one. The printer engine 2 forms an image on each of the recording sheets, which are discharged on a stacker 4. On an outer surface of the printer 1, a operation panel 5 is provided, which includes a display unit 5A and various operation buttons allowing a user to input various commands and the like.

Figure 2:
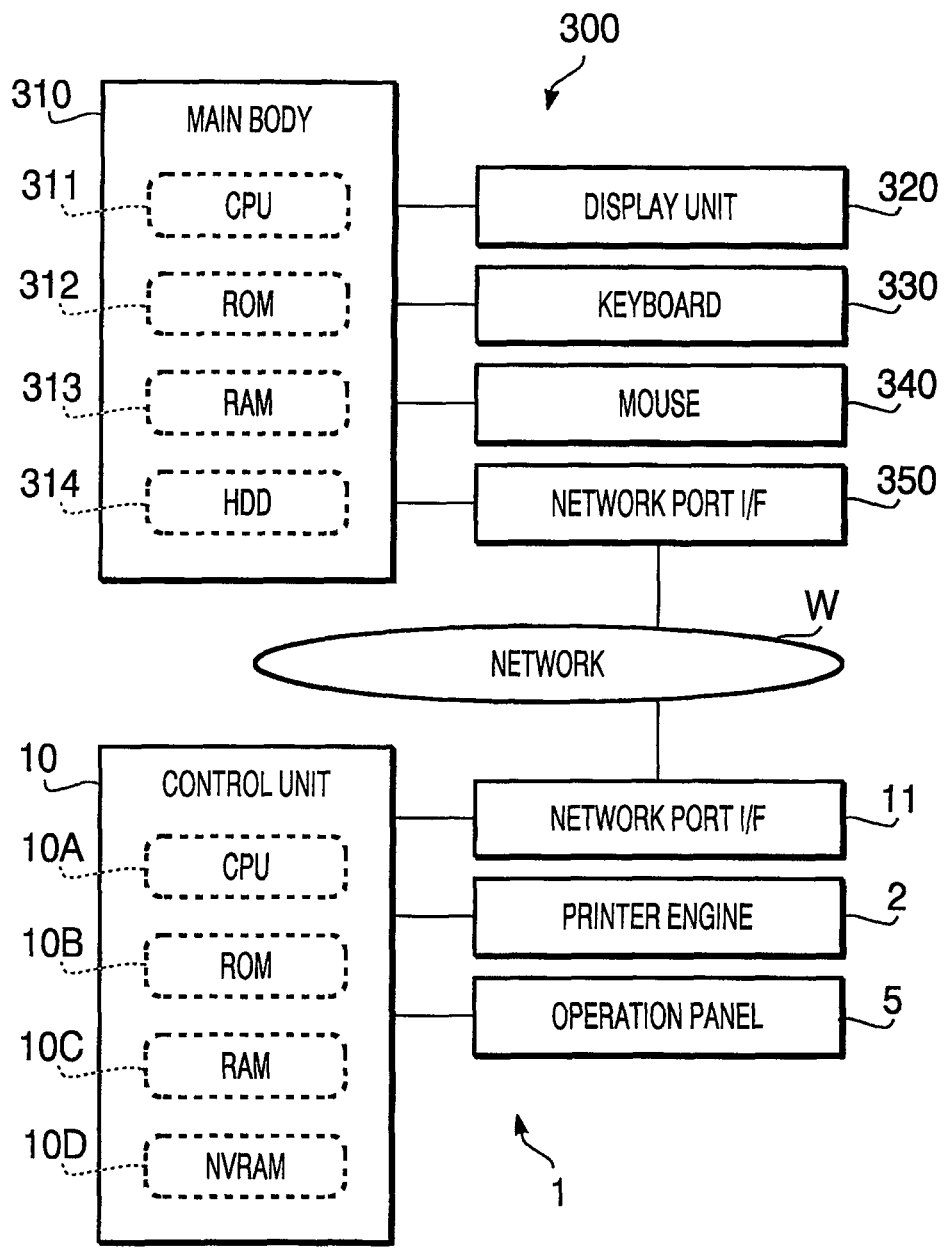
FIG. 2 is a block diagram showing a configuration of a control system of the printing system shown in FIG. 1.

FIG. 2 is a block diagram showing an electrical configuration of the printing system.

As shown in FIG. 2, a main body 310 of the PC 300 includes a CPU (Central Processing Unit) 311, a ROM (Read Only Memory) 312, a RAM (Random Access Memory) 313, and an HDD (Hard Disk Drive) 314. To the main body 310, a display 320 such as a CRT (Cathode Ray Tube), a keyboard 330 and a mouse 340 are connected (see FIG. 1). Further, the main body 310 of the PC 300 is provided with a network port I/F (interface) 350 for connecting the PC 300 to the network W or a public telephone line.

The printer 1 is provided with a control unit 10 for controlling the printer engine 2 and the like. The control unit 10 is configured as a microcomputer provided with a CPU 10A, a ROM 10B and a RAM 10C. The control unit 10 is also provided with an NVRAM (Non-Volatile RAM) 10D which retains data even if power supply is off. The printer 1 further includes a network port I/F (interface) 11 for connecting the printer 1 with the PC 300 via the network W.

Figure 3:
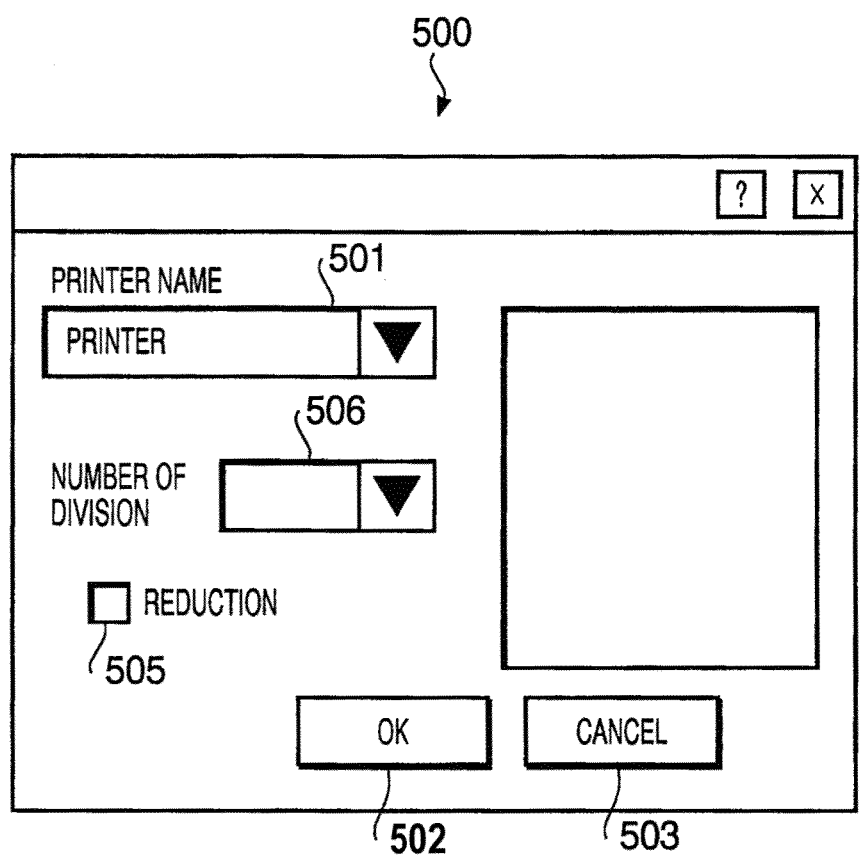
FIG. 3 shows a user interface for printing which is displayed on a display of a personal computer of the printing system.

Next, a process executed by the control system described above will be described. FIG. 3 shows a user interface 500 which is a dialogue window displayed when the print data is generated with an application in the PC 300 and the user instructs to start a printing operation. It should be noted that the user interface 500 is displayed during execution of the application, using a module of the printer driver.

As shown in FIG. 3, the user interface 500 is of a well-known dialogue window provided with a printer name indicating section 501, an "OK" button 502 for executing the printing operation, and cancel button 503 for terminating the printing operation.

Further, as shown in FIG. 3, the user interface 500 includes the following sections/buttons. That is, the user interface 500 includes a check box 505 for reducing the image (according to the embodiment, the reduction ratio is fixed to 71%) and a division number input box 506 for entering a number of sheets on which an image for one page is divided and printed.

If the "OK" button 502 is clicked using the mouse 340, the CPU 311 of the PC 300 executes a printing process shown in FIG. 4 by executing a program stored in the HDD 314 as a printer driver.

FIG. 4 is a flowchart illustrating the printing process. As shown in FIG. 4, in S1, the process acquires a model type of the printer 1 displayed on the printer name indicating section 501 of the user interface 500. Then, in S3, S5 and S7, a scaling process, a page dividing process and a rotating process are subsequently executed. Then, in S9, the print data to which the filtering processes are applied in S3, S5 and S7 is converted into PDL data and transmitted to the printer 1. Then, the process is terminated.

The scaling process in S3 is, as shown in FIG. 5A, to reduce an image P represented by the print data to a reduced image PA which is printed on the recording sheet. The dividing process in S4 is, as shown in FIG. 5B, to divide the image P represented by the print data into a plurality of (in the example of FIG. 5B, two) images PB1 and PB2. The rotating process in S7 is, as shown in FIG. 5C, to rotate the image PB1 represented by the print data so that a rotated image PC is printed on the recording sheet. As described in detail hereinafter, the filtering processes (S3, S5, S7) are modified based on the model type acquired in S1.

FIG. 6 is a flowchart illustrating the scaling process. As shown in FIG. 6, in S31, the CPU 311 retrieves the print data, which has been generated by an application and stored in a predetermined area on RAM 313. Then, in S32, the CPU 311 acquires the print setting from the print data. In S33, the CPU 311 modifies the print data based on the model name.

FIGS. 7A and 7B are tables showing functions corresponding to model types of the printer 1. In the following description, for explanation purpose, a model having functions shown in FIG. 7A will be referred to as model A, and a model having functions shown in FIG. 7B will be referred to as model B.

As shown in FIG. 7A, the model A printer 1 is capable printing image data for A4, A5, B5, B6, A3 and B4 recording sheets. Specifically, when the sheet size represented by the image data is A3 or B4, the image is divided into two images (see FIG. 5B) and the two divided images are printed on two pages of A4 size sheets or B5 size sheets, respectively. The model A printer 1 is capable of using a first tray and a second tray as its usable sheet feed tray 3, and each of the first and second tray can accommodate one of A4, A5, B5 and B6 recording sheets. Further, the model A printer 1 is capable of printing an image in either portrait or landscape orientation. That is, the orientation of the recording sheets with respect to the printer 1 is unchangeable, while the image is printed as rotated by 90 degrees when the image is printed in the landscape orientation.

If the model A printer 1 is selected as the printer 1 to be used in the printer name indicating section 501 of the user interface 500 and the print settings as shown in FIG. 8A are included in the print data, the CPU 311 modifies the print settings in S33 to obtain modified print settings as shown in FIG. 8B. That is, in FIG. 8A, the size of the recording sheet is B4. In this case, as described above, the image is divided into two divided images, which are printed on B5 size recording sheets, respectively.

As shown in FIG. 7B, the model B printer 1 is capable printing image data for A4, A5, B4, B5, B6 and A3 recording sheets. Printing an A3 size image on the A3 recording sheet can be executed only when a manual feed tray. Otherwise, the A3 size image is reduced. The model B printer 1 is capable of using a first tray, a second tray and a manual feed tray as its usable sheet feed tray 3, and each of the first and second tray can accommodate one of A4, A5, B4, B5 and B6 recording sheets. The manual feed tray can be used for all the usable recording sheets (i.e., A4, A5, B4, B5, B6 and A3 recording sheets). Further, the model B printer 1 is capable of printing an image in either portrait or landscape orientation. That is, the orientation of the recording sheets with respect to the printer 1 is unchangeable, while the image is printed as rotated by 270 degrees when the image is printed in the landscape orientation.

In the print setting modifying process executed in S33, if the model B printer 1 is selected as the printer 1 to be used and the print data includes the print settings shown in FIG. 9A, the CPU 311 modifies the print settings to obtain the modified print settings as shown in FIG. 9B. Specifically, since the print setting shown in FIG. 9A specifies the A4 recording sheet and second tray, the modified print setting shown in FIG. 9B specifies that the scaling setting is "reduction." Further, in FIG. 9A, the landscape orientation is specified, and accordingly, the modified print setting shown in FIG. 9B specifies rotation of the image by 270 degrees in accordance with the characteristic of the model B printer 1.

FIGS. 10 and 11 show flowcharts each illustrating the print setting modifying process executed in S33. Specifically, FIG. 10 shows a print setting modifying process A which is executed when the printer 1 is the model A printer, and FIG. 11 shows a print setting modifying process B which is executed when the printer 1 is the model B printer.

In the print setting modifying process A shown in FIG. 10, in S101, the CPU 311 judges whether the number of division in the print setting is set to two or more. If the number of division is set to one or is not set (S101: NO), the CPU 311 judges whether the size of the recording sheet in the print setting is A3 or B4 (S102). If the size of the recording sheet is set to A3 or B4 (S102: YES), the CPU 311 sets the number of division to two (S103) and proceeds to S104. If the size of the recording sheet is not A3 or B4 (S102: NO), the CPU 311 skips S103 and proceeds to S104. If the number of division is set to two or more (S101: YES), the CPU 311 also proceeds to S104. With the above process, if the print setting included in the print data does not specify the number of division of the image (S101: NO), and specifies A3 or B4 size of the recording sheets (S102: YES) which are not accommodated in the model A printer 1, the number of division is set to two (S103).

In S104, the CPU 311 judges whether the printing orientation specified in the print setting is "landscape" or not. If the landscape orientation is specified (S104: YES), the CPU 311 sets the rotation of image to 90 degrees (S105). If the landscape orientation is not specified (S104: NO), the CPU 311 does not change the printing orientation, and completes the print setting modifying process A. After execution of this process, the CPU 311 proceeds to S34 of the scaling process shown in FIG. 6.

In the print setting modifying process B shown in FIG. 11, the CPU 311 judges whether the size of the recording sheet specified by the print setting is A3 (S201). If the specified size is A3 (S201: YES), the CPU 311 judges whether the paper tray specified by the print setting is the manual feed tray (S202) since, in the model B printer 1, the A3 recording sheets can be set to the manual feed tray. If the specified tray is not the manual feed tray (S202: NO), the CPU 311 sets the scaling of the print setting to "reduction" (S203). If the specified tray is the manual feed tray (S202: YES), the CPU 311 does not change the print setting. If the specified size is not A3 (S201: NO), the CPU 311 proceeds from S201 to S204, skipping S203. With the above process, if the size of the recording sheet specified in the print setting is A3 (S201: YES) and the tray specified in the print setting is not the manual feed tray (S202: NO), the CPU 311 sets the scaling of the print setting to "reduction" (S203).

In S204, the CPU 311 judges whether the printing orientation specified in the print setting is the landscape orientation. If the landscape orientation is specified (S204: YES), the CPU 311 sets the rotation angle to 270 degrees (S205). If the printing orientation specified in the print setting is not the landscape orientation (i.e., the portrait orientation is specified), the CPU 311 does not change the printing orientation. After completion of the print setting modifying process B, the CPU 311 proceeds to S34 of the scaling process shown in FIG. 6.

As above, after the CPU 311 modifies (if necessary) the print setting in accordance with the characteristic of the printer 1 acquired in S1 (FIG. 4), the CPU 311 judges whether the scaling of the print setting is set to "reduction" in S34. If the scaling is set to "reduction" (S34: NO), the CPU 311 proceeds to S35, skipping S36, and transmits the print data to the RAM 313 and the CPU 311 proceeds to S5 of the print setting shown in FIG. 4. If the scaling is set to "reduction" (S34: YES), the CPU 311 executes an operation to reduce the image printed on the recording sheet at the ratio of 71%, and then proceeds to S35. With the above process, the scaling process (see FIG. 5A) is executed when necessary.

FIG. 12 is a flowchart illustrating the page dividing process called in S5 of the printing process shown in FIG. 4. In the page dividing process, the CPU 311 retrieves the print data in S51 as is done in S31. Then, in S52, the CPU 311 acquires the print setting from the print data and executes the print setting modifying process in S53 in accordance with the model type acquired in S1. It should be noted that the print setting modifying process executed in S53 is the same as the process executed in S33 of the scaling process show in FIG. 6. The print setting may be modified when each filtering process is executed. Therefore, according to the embodiment, the same print setting modifying process is executed in each filtering process.

In S54, the CPU 311 judges whether the number of division is set to more than one. If the number of division is set to one or the number of division is not set in the print setting (S54: NO), the CPU 311 proceeds to S55 and transmits the print data to the RAM 313. Then, the CPU 311 proceeds to S7 of the printing process shown in FIG. 4.

If the number of division is set to more than one (S54: YES), the CPU 311 judges whether the printing orientation should be changed in S56. If the printing orientation is not to be changed (S56: NO), the CPU 311 divides the page data in accordance with the number of division of the print setting (S57) and transmits the print data to the RAM 313 (S55).

If the printing orientation is to be changed (S56: YES), the CPU 311 proceeds to S61 and judges whether the current printing orientation is "landscape" or not (i.e., "portrait"). If the current printing orientation is "landscape" (S61: YES), the CPU 311 changes the printing orientation to "portrait" (S62), and proceeds to S57. If the current printing orientation is "portrait" (S61: NO), the CPU 311 changes the printing orientation to "landscape" (S63) and proceeds to S57. As above, in the page dividing process shown in FIG. 12, the page is divided in accordance with the number of division specified in the print setting (see FIG. 5B).

FIG. 13 is a flowchart illustrating the rotating process called at S7 of the printing process shown in FIG. 4. In the rotating process shown in FIG. 13, similarly to S31, the CPU 311 retrieves the print data from the RAM 313 (S71). Then, in S72, the CPU 311 acquires the print setting from the print data, and executes the print setting modifying process which is the same process executed in S33 in the scaling process shown in FIG. 6.

In S74, the CPU 311 judges whether the rotation angle of the print setting is set to zero (0) degree. If the rotation angle is set to zero degree (S74: YES), the CPU 311 proceeds to S75, transmits the print data to the RAM 313 and proceeds to S9 of the printing process shown in FIG. 4. If the rotation angle is not set to zero degree (S74: NO), the CPU 311 executes a process to rotate the page data in accordance with the rotation angel set in the print setting (S76), and proceeds to S75. With the above process, the image to be printed is rotated if necessary (see FIG. 5C).

After completion of the filtering processes (S3, S5 and S7), the CPU 311 applies the PDL conversion process to the print data, which has been processed by the filtering processes, in S9, and transmits the generated PDL data to the printer 1.

As described above, according to the embodiment, the print setting is modified in accordance with the model type of the printer 1 (S33, S53 and S73), and then respective filtering operation are executed in the filtering processes (S3, S5 and S7). Therefore, according to the embodiment, without installing the printer drivers including the filters for all models of the printer 1, appropriate filtering processes can be executed in accordance with the model type of the printer 1 to be used.

FIG. 14 schematically shows the configuration of the programs according to the embodiment. That is, according to the embodiment, a program 90 of the main routine including the programs (filtering program modules) 91, 92 and 93 for respective filtering processes is commonly used, while programs 95A and 95B corresponding to respective models A and B of the printer 1 are additionally installed on the HDD 314. The additional programs 95A and 95B may include PDL-conversion program modules 96A and 96B corresponding to the model A and model B executing the PDL converting process A and PDL converting process B corresponding to the model type A and model type B, and print setting modifying program modules 97A and 97B executing the print setting modifying process A and print setting modifying process B, respectively. According to the above configuration, the areas on the HDD 314 can be saved in comparison with a case where printer drivers corresponding to individual printer models are stored. By configuring the print setting modifying program modules 97A and 97B of the print setting modifying processes A and B appropriately, the print setting can be appropriately modified in accordance with the characteristics of the model types of the printer 1.

It should be noted that, in the above-described exemplary embodiment, the number of printer models are two for the sake of explanation. However, it is appreciated by person of ordinary skill in the art that the invention need not be limited to the case where the model type is two, but the invention is applicable when the number of model types is more than two.

It should be noted that the invention need not be limited to the configuration of the above-described exemplary embodiment, and various modification can be made without departing the scope of the invention. For example, in the embodiment, the print setting is modified in S33, S53 and S73. This may be modified such that the filtering processes may be modified. It should be noted, however, by modifying the print setting as in the embodiment, the storage capacity of the HDD 314 is well saved.

In the embodiment, the model types are acquired via the user interface 500. This may be modified such that the CPU 311 may acquire the model types of the printer by exchanging commands with the printer 1.

As the filtering processes, in addition to the above described processes, a watermark applying process, a date applying process and the like may be employed. In particular, when the print data including the color watermark is to be transmitted to a printer which only prints a monochromatic image, the color watermark may be converted into a monochromatic gray-scale image for a certain printer, while the color watermark may be converted into a patterned (e.g., hatching-applied) image for another printer. Such a modification can also be achieved easily according to the invention.

What is claimed is:

1. A print controlling device, comprising:
a processor; and
memory operatively coupled to the processor and storing computer readable instructions that, when executed by the processor, cause the processor to:
obtain image data;
obtain print settings from the image data;
determine whether a printing device to be used for printing is a first printer or a second printer;
execute a common process to be applied to the image data, the common process including at least a first image processing process and a second image processing process to be executed subsequently, wherein the common process is executed such that:
the processor applies the first image processing process to the image data based on the print settings obtained from the image data, wherein if the print settings obtained from the image data cannot be executed by the determined one of the first printer and the second printer, the processor, at a beginning of the first image processing process, modifies the print settings obtained from the image data and used in the first image processing process to a modified print setting that the printing device is able to execute, and after modifying the print settings, executes the first image processing process based on the modified print settings, wherein the first image processing process is executed irrespective of whether the printing device to be used for printing is determined to be the first printer or the second printer; and
the processor applies the second image processing process to the image data to which the first image processing process has been applied based on the print settings obtained from the image data, wherein if the print settings obtained from the image data cannot be executed by the determined one of the first printer and the second printer, the processor, at a beginning of the second image processing process, modifies the print settings obtained from the image data and used in the second image processing process to a modified print setting that the printing device is able to execute, and after modifying the print settings, executes the second image processing process based on the modified print settings, wherein the second image processing process is executed irrespective of whether the printing device to be used for printing is determined to be the first printer or the second printer;
execute a process specific to the determined one of the first printer and the second printer; and
transmit the image data, to which the common process and the process specific to the determined one of the first printer and the second printer has been applied, to the determined one of the first printer and the second printer.

2. The print controlling device according to claim 1, wherein one of the first and second image processing processes comprises an image dividing process for dividing an image to be printed on one recording sheet into a plurality of images to be respectively printed on a plurality of recording sheets.

3. The print controlling device according to claim 1, wherein the memory stores further computer readable instructions that, when executed by the processor, cause the processor to:
allow a user to designate the printing device to be used for printing.

4. The print controlling device according to claim 1, wherein one of the first and second image processing processes comprises a scaling process for changing a size of an image represented by the image data to a scaled size different from the size previously represented by the image data.

5. The print controlling device according to claim 1, wherein one of the first and second image processing processes comprises a rotating process for changing a printing orientation of an image represented by the image data to a rotated printing orientation different from the printing orientation previously represented by the image data.

6. A non-transitory computer accessible recording medium containing a program that, when executed by a computer, causes the computer to function as a print controlling device and execute the steps of:
obtaining image data;
obtaining print settings from the image data;
determine whether a printing device to be used for printing is a first printer or a second printer;
executing a common process to be applied to the image data, the common process including at least a first image processing process and a second image processing process to be executed subsequently, wherein the common process is executed such that:
the computer applies the first image processing process to the image data based on the print settings obtained from the image data, wherein if the print settings obtained from the image data cannot be executed by the determined one of the first printer and the second printer, the computer, at a beginning of the first image processing process, modifies the print settings obtained from the image data and used in the first image processing process to a modified print setting that the printing device is able to execute, and after modifying, the print settings, executes the first image processing process based on the modified print settings, wherein the first image processing process is executed irrespective of whether the printing, device to be used for printing is determined to be the first printer or the second printer; and
the computer applies the second image processing process to the image data to which the first image processing process has been applied based on the print settings obtained from the image data, wherein if the print settings obtained from the image data cannot be executed by the determined one of the first printer and the second printer, the computer, at a beginning of the second image processing process, modifies the print settings obtained from the image data and used in the second image processing process to a modified print setting that the printing device is able to execute, and after modifying the print settings, executes the second image processing process based on the modified print settings, wherein the second image processing process is executed irrespective of whether the printing device to be used for printing is determined to be the first printer or the second printer; and
executing a process specific to the determined one of the first printer and the second printer; and
transmitting the image data, to which the common process and the process specific to the determined one of the first printer and the second printer has been applied, to the determined one of the first printer and the second printer.

7. The non-transitory computer accessible recording medium according to claim 6, wherein the program, when executed, further causes the computer to execute the step of:
allowing a user to designate the printing device to be used for printing.

8. The non-transitory computer accessible recording medium according to claim 6, wherein one of the first and second image processing processes comprises a scaling process for changing a size of an image represented by the image data to a scaled size different from the size previously represented by the image data.

9. The non-transitory computer accessible recording medium according to claim 6, wherein one of the first and second image processing processes comprises a rotating process for changing a printing orientation of an image represented by the image data to a rotated printing orientation different from the printing orientation previously represented by the image data.

10. A printing system comprising:
a print controlling device; and
a plurality of printing devices which are connectable to the print controlling device including a first printer and a second printer,
wherein the print controlling device comprises:
a processor; and
memory operatively coupled to the processor and storing computer readable instructions that, when executed by the processor, cause the processor to:
obtain image data;
obtain print settings from the image data;
determine whether a printing device to be used for printing is the first printer or the second printer;
execute a common process to be applied to the image data, the common process including at least a first image processing process and a second image processing process to be executed subsequently, wherein the common process is executed such that:
the processor applies the first image processing process to the image data based on the print settings obtained from the image data, wherein if the print settings obtained from the image data cannot be executed by the determined one of the first printer and the second printer, the processor, at a beginning of the first image processing process, modifies the print settings obtained from the image data and used in the first image processing process to a modified print setting that the printing device is able to execute, and, after modifying the print settings, executes the first image processing process based on the modified print settings, wherein the first image processing process is executed irrespective of whether the printing device to be used for printing is determined to be the first printer or the second printer; and
the processor applies the second image processing process to the image data to which the first image processing process has been applied based on the print settings obtained from the image data, wherein if the print settings obtained from the image data cannot be executed by the determined one of the first printer and the second printer, the processor, at a beginning of the second image processing process, modifies the print settings obtained from the image data and used in the second image processing process to a modified print setting that the printing device is able to execute, and after modifying the print settings, executes the second image processing process based on the modified print settings, wherein the second image processing process is executed irrespective of whether the printing device to be used for printing is determined to be the first printer or the second printer;
execute a process specific to the first printer and the second printer; and transmit the image data, to which the common process and the process specific to the determined one of the first printer and the second printer has been applied, to the determined one of the first printer and the second printer.

11. The printing system according to claim 10, wherein one of the first and second image processing processes comprises an image dividing process for dividing an image to be printed on one recording sheet into a plurality of images to be respectively printed on a plurality of recording sheets.

12. The printing system according to claim 10, wherein the memory stores further computer readable instructions that, when executed by the processor, cause the processor to:
allow a user to designate the printing device to be used for printing.

13. A non-transitory computer accessible recording medium containing a program that, when executed by a computer, causes the computer to function as a print controlling device and execute the steps of:
obtaining image data;
obtaining print settings from the image data;
determining whether a printing device to be used for printing is a first printer or a second printer; and
executing a common process irrespective of whether the printing device to be used for printing is determined to be the first printer or the second printer, the common process including:
a scaling process configured to scale the image data based on the print settings,
a page dividing process configured to divide the image data into a plurality of pages based on the print settings, and
a rotating process configured to rotate the image data based on the print settings, wherein the common process is executed such that:
the computer modifies the print settings obtained from the image data and used in the scaling process to a modified print setting based on a specification of the determined printing device, and after modifying the print settings, the computer executes the scaling process based on the modified print settings,
the computer modifies the print settings obtained from the image data and used in the page dividing process to a modified print setting based on a specification of the determined printing device, and after modifying the print settings, executes the page dividing process based on the modified print settings, and
the computer modifies the print settings obtained from the image data and used in the rotating process to a modified print setting based on a specification of the determined printing device, and after modifying the print settings, executes the rotating process based on the modified print settings; and
after executing the common process irrespective of whether the printing device to be used for printing is determined to be the first printer or the second printer,
in a case that the printing device to be used for printing is determined to be the first printer, executing a first PDL conversion process to convert the image data processed by the common process into a first PDL specific to the first printer and transmitting the first PDL to the first printer, and
in a case that the printing device to be used for printing is determined to be the second printer, executing a second PDL conversion process to convert the image data processed by the common process into a second PDL specific to the second printer and transmitting the second PDL to the second printer.

* * * * *

UNITED STATES PATENT AND TRADEMARK OFFICE
CERTIFICATE OF CORRECTION

PATENT NO. : 8,823,972 B2
APPLICATION NO. : 12/130233
DATED : September 2, 2014
INVENTOR(S) : Yuji Miyata It is certified that error appears in the above-identified patent and that said Letters Patent is hereby corrected as shown below:

In the claims

In Column 9, Claim 6, Line 28:
Please delete "modifying, the print" and insert --modifying the print--

In Column 9, Claim 6, Line 31:
Please delete "printing, device" and insert --printing device--

In Column 10, Claim 10, Line 66:
Please delete "the first printer" and insert --the determined one of the first printer--

Signed and Sealed this
Twenty-sixth Day of July, 2016

Michelle K. Lee
*Director of the United States Patent and Trademark Office*